(12) United States Patent
Sawyers

(10) Patent No.: US 6,888,337 B2
(45) Date of Patent: May 3, 2005

(54) POWER SYSTEM AND METHOD

(75) Inventor: Thomas P. Sawyers, Hempstead, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 69 days.

(21) Appl. No.: 10/379,505

(22) Filed: Mar. 4, 2003

(65) Prior Publication Data

US 2004/0174139 A1 Sep. 9, 2004

(51) Int. Cl.$^7$ ................................................ H02J 7/00
(52) U.S. Cl. ......................................................... 320/103
(58) Field of Search ................................ 320/103, 137, 320/125, 164; 713/300; 307/64, 66

(56) References Cited

U.S. PATENT DOCUMENTS

| | | | |
|---|---|---|---|
| 4,638,175 A | * 1/1987 | Bradford et al. | 307/64 |
| 5,382,893 A | 1/1995 | Dehnel | 320/160 |
| 5,541,490 A | 7/1996 | Sengupta et al. | 320/160 |
| 5,561,361 A | 10/1996 | Sengupta et al. | 320/152 |
| 5,684,382 A | * 11/1997 | Fritz et al. | 320/164 |
| 5,717,309 A | * 2/1998 | Cho | 320/125 |
| 5,717,937 A | 2/1998 | Fritz | 713/300 |
| 5,739,596 A | * 4/1998 | Takizawa et al. | 307/66 |
| 5,838,141 A | 11/1998 | Sengupta et al. | 320/145 |
| 5,903,764 A | * 5/1999 | Shyr et al. | 713/300 |
| 6,018,229 A | 1/2000 | Mitchell et al. | 320/112 |
| 6,181,029 B1 | * 1/2001 | Berglund et al. | 307/66 |

* cited by examiner

Primary Examiner—Pia Tibbits

(57) ABSTRACT

The disclosed embodiments relate to power systems and methods. One such power system includes an adapter that produces a power output. A converter stage receives the power output and in turn provides a regulated output. The regulated output is delivered to a battery and to a DC—DC component.

18 Claims, 3 Drawing Sheets ns and requests. The processor 12 may be coupled to

POWER SYSTEM AND METHOD

BACKGROUND OF THE RELATED ART

Portable computing devices may derive power from internal batteries, which may be charged by being connected to an external source of AC or DC power. When charged, the battery may be used to power the portable computing device when no source of AC or DC power is readily available. Additionally, the battery may function as back-up power when there is a disruption to AC or DC power used to power the portable device. When the portable device is operating on AC or DC power, the battery may be recharging for later use as a primary supply of power.

In designing the power system of personal computing devices, the configuration and layout of components may affect the operation and efficiency of the device. For instance, improper placement of components may result in problems, such as increasing potential damages to batteries, decreasing efficiency, or reducing the amount of time that the battery is able to provide power for the portable device.

Standards relating to the design of power systems for portable computing devices exist. One such standard is the Smart Battery System v1.1. Other standards include the Intelligent Battery Architecture, version 2 ("IBA") and the Constant Power Adapter ("CPA") method. These standards may inhibit efficiency in power systems.

SUMMARY

In one embodiment of the present invention, a power system for a processor-based electronic system comprises a power adapter for producing a power output. A converter stage receives the power output and generates a regulated power. The regulated output is delivered to a battery and to a DC-DC component.

Another embodiment relates to a method of operation for a power system. The method comprises producing a power output, delivering the power output to a converter, regulating the power output, delivering the regulated output to a DC—DC component and a battery. The battery charges from the regulated output, while the DC—DC component adjusts the regulated output into a plurality of voltages for a plurality of circuits.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

Figure 1:
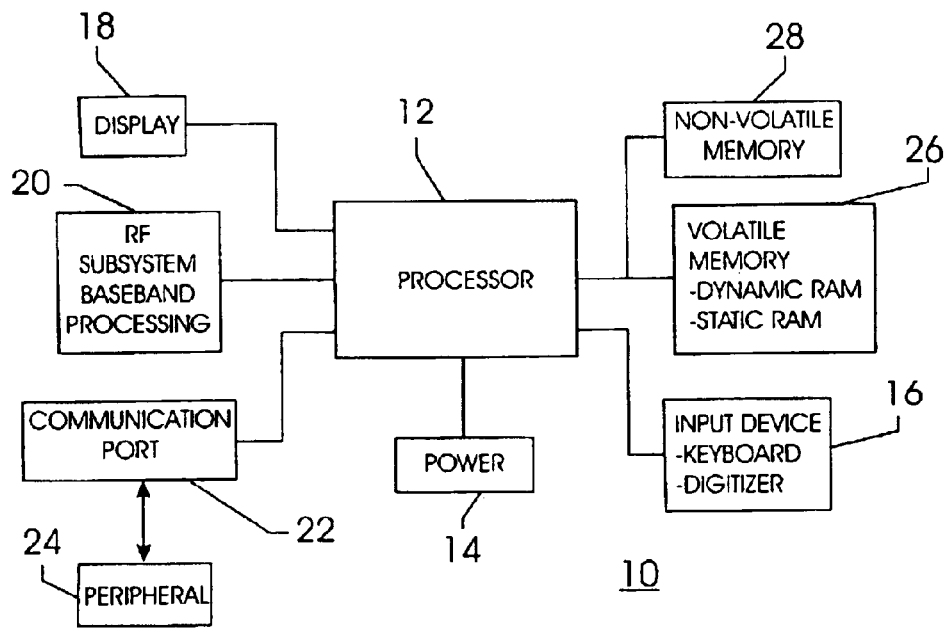
FIG. 1 illustrates a block diagram of a processor-based system in accordance with an embodiment of the present invention.

Referring initially to FIG. 1, a block diagram of a processor-based electronic device or system, generally designated by reference numeral 10, is illustrated. The system 10 may be any of a variety of types such as a computer, pager, cellular phone, personal organizer or the like. In a processor-based device, a processor 12, such as a microprocessor, may control the operation of system functions and requests. The processor 12 may be coupled to various types of memory devices to facilitate its operation. For example the processor 12 may be connected to a volatile memory 26 and a non-volatile memory 28. The volatile memory 26 may comprise a variety of memory types, such as static random access memory ("SRAM") or dynamic random access memory ("DRAM") or the like. The non-volatile memory 28 may comprise various types of memory such as electrically programmable read only memory ("EPROM"), and/or flash memory or the like.

The system 10 includes a power supply 14, which may comprise a battery or batteries, an AC power adapter and/or a DC power adapter. Various other devices may be coupled to the processor 12 depending on the functions that the system 10 performs. For example, an input device 16 may be coupled to the processor 12 to receive input from a user. The input device 16 may comprise a user interface and may include buttons, switches, a keyboard, a light pen, a mouse, a digitizer and/or a voice recognition system or the like. An audio or video display 18 may also be coupled to the processor 12 to provide information to the user.

A communications port 22 may be adapted to provide a communication interface between the electronic device 10 and peripheral devices 24. The peripheral 24 may include a docking station, expansion bay or other external component. Furthermore, an RF sub-system/baseband processor 20 may be coupled to the processor 12 to provide wireless communication capability.

Figure 2:
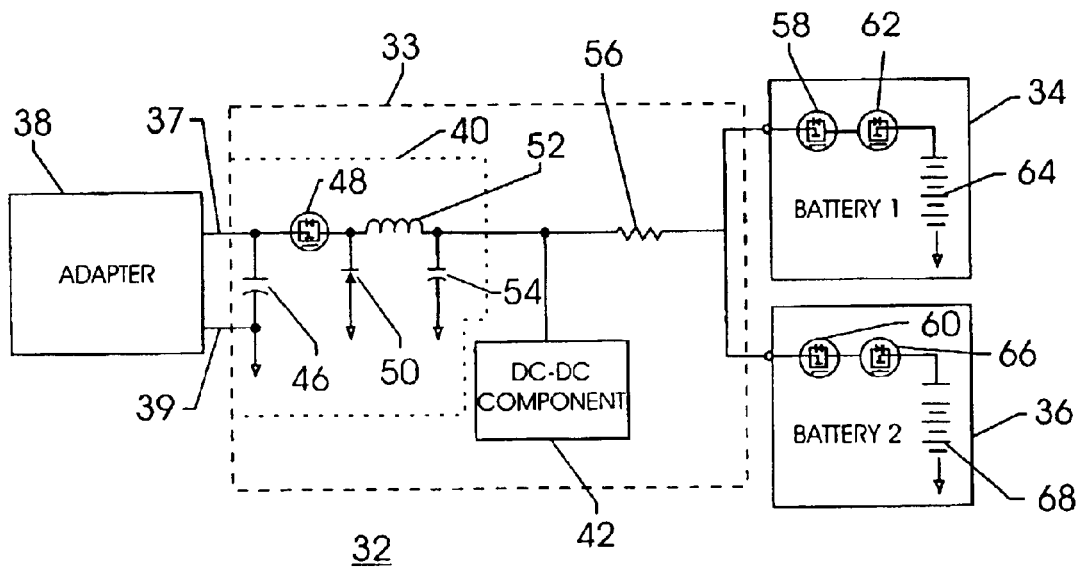
FIG. 2 illustrates a schematic diagram of a power system in accordance with an embodiment of the present invention.

FIG. 2 illustrates a schematic diagram of a power system in accordance with an embodiment of the present invention. The power system is generally referred to by the reference numeral 32. An adaptor 38 comprises output terminals 37 and 39. The adaptor 38 may be either an AC or DC power adaptor. A converter stage 40 (shown in dashed lines) includes a capacitor 46, a switch 48, a diode 50, an inductor 52, and a capacitor 54, which are positioned on a circuit board 33. Various other components may be included in the converter stage, depending upon design considerations such as the desired output voltage and the like. The capacitor 46 is connected across the adaptor outputs 37 and 39. The terminal 37 is additionally connected to the switch 48, which may be a 30-volt MOSFET switch, or any other suitable switching component. The switch 48 is connected between the cathode of a diode 50 and a terminal of an inductor 52. The anode of the diode 50 is connected to a ground or circuit of lower potential. The inductor 52 is also connected to the DC—DC component 42 and the capacitor 54.

A current sense circuit, such as a current sense resistor 56 is connected between the converter stage 40 and a common connection to a first battery 34 and a second battery 36. The current sense resistor 56 provides feedback regarding and amount of current that is flowing to or from the batteries 34 and 36. The battery 34 comprises a switch 58 and a switch 62, which are connected in series to a battery cell stack 64. The battery 36 comprises a switch 60 and a switch 66, which are connected in series to a battery cell stack 68.

If the adaptor 38 is connected to a power source, power from the adaptor 38 will flow through the converter stage 40 to the DC—DC component 42 and the batteries 34 and 36. The converter stage 40 regulates the output through the switch 48 and maintains a voltage level sufficient to ensure the power distributor or DC—DC component 42 is able to operate efficiently. In this mode, the batteries 34 and 36 can charge. By placing the switches 58 and 62 in the battery 34 in a back-to-back configuration, current flows into the battery cell stack 64 when the switches 58 and 62 are turned "on." The same is true for the switches 60 and 66, which control the flow of current to the battery cell stack 68. Conversely, when the battery 34 or the battery 36 is charged, the switches 58 and 62 (for the battery 34), and switches 60 and 66 (for the battery 36) may be turned "off" to block current from flowing to the respective batteries.

Alternatively, if the adaptor 38 is not providing power, the switches 58 and 62 (for the battery 34) or the switches 60 and 66 for the battery 36 may be turned "on" to power the system 10 (FIG. 1). In this situation, each battery 34 or 36 blocks the in-flow of current to prevent one of the batteries 34 or 36 at a higher voltage from charging the other. This adaptation enables the DC—DC component 42 to continue to receive an uninterrupted supply of power to operate the system 10 (FIG. 1). In another embodiment, a microcontroller circuit or other similar circuit is used to determine which battery 34 or 36 will provide power to the DC—DC component 42. Such a circuit operates by measuring voltage differential between the two batteries.

The regulation of the power output from the switch 48 enables the use of switches with lower voltages ratings than would otherwise be possible for the switches 58, 60, 62 and 66. As an example, such regulation enables the batteries 34 and 36, as well as the DC—DC component 42, to be configured to receive a maximum of about 16.8 volts DC. This enables the use of 20-volt switches for the switches 58, 60, 62 and 66, and also in the DC—DC component 42, where more robust and expensive switches would otherwise be needed. The use of MOSFET switches with lower voltage additionally saves power by reducing the voltage drop across the switches relative to switches with higher voltage ratings.

Figure 3:
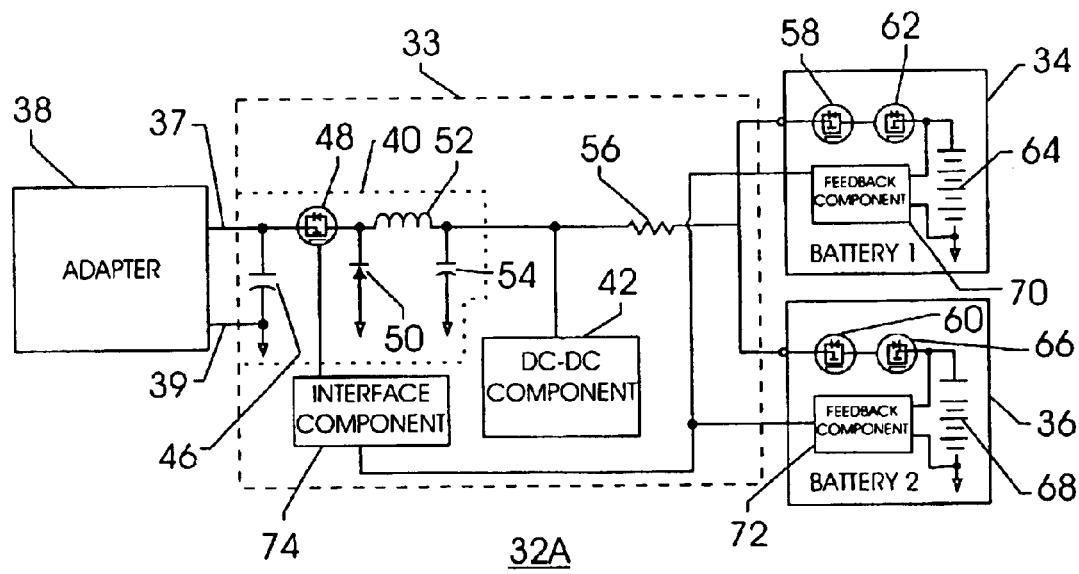
FIG. 3 illustrates a schematic diagram of a power system with a control circuit in accordance with an embodiment of the present invention.

FIG. 3 illustrates a schematic diagram of a power system with a control circuit in accordance with an embodiment of the present invention. The control circuit, which is generally referred to by the reference numeral 32A, incorporates feedback components and an interface component into the control circuit 32 (FIG. 2). The feedback components are utilized to control the voltage or current at various components throughout the power system 32A.

A first feedback component is connected across the battery cell stack 64 and a second feedback component 72 is connected across the battery cell stack 68. The outputs of the two feedback components 70 and 72 are combined to form an input to an interface component 74, which provides input to the switch 48. The first feedback component 70, the second feedback component 72, and/or the interface component 74 may be internal or external to the respective batteries.

The interface component 74 controls the operation of the switch 48, including the current flow through the switch 48, based on the input it receives from the feedback components 70 and 72. This input is influenced by various factors, such as the status of the batteries 34 and 36 and whether the adaptor 38 is supplying power. For instance, if neither battery 34 nor 36 needs to be charged or if the adaptor 38 is not supplying power, then the interface component 74 does not send control signals to the switch 48 to adjust the current flow. However, if the batteries 34 or 36 require charging, then the switch 48 is used to regulate the charging process. The charging process is regulated by using signals from the battery feedback components 70 and 72 to the interface component 74 to adjust the current flow into the batteries 34 and 36. If the current flow through the switch 48 is to be increased or decreased, then the interface component 74 transmits the appropriate signal to the switch 48.

Figure 4:
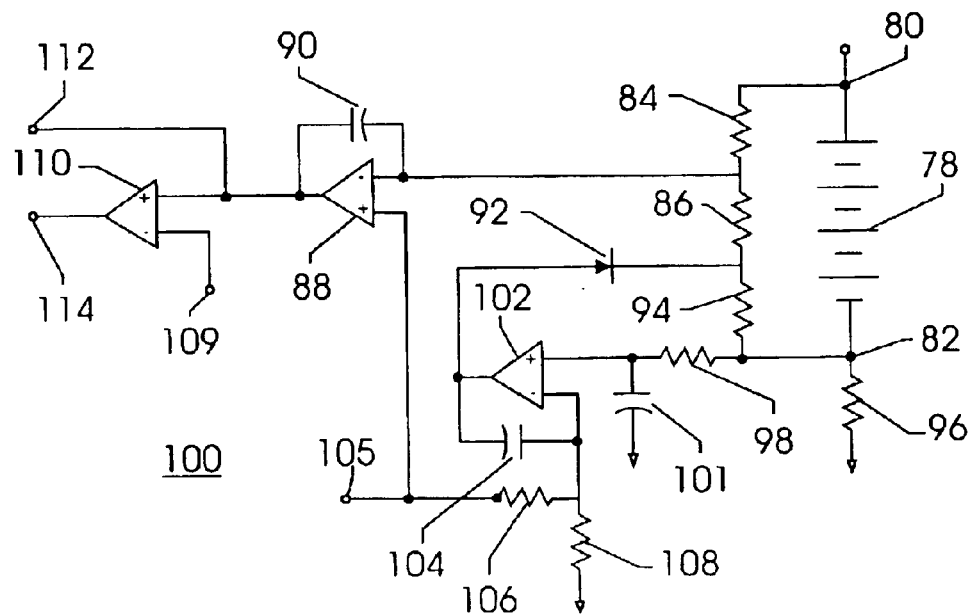
FIG. 4 illustrates a schematic diagram of a feedback circuit in accordance with an embodiment of the present invention.

FIG. 4 illustrates a schematic diagram of a feedback circuit in accordance with an embodiment of the present invention. The feedback circuit, which is generally referred to by the reference numeral 100, corresponds to each of the feedback components 70 and 72 (FIG. 3). The feedback circuit 100 is connected across a battery cell stack 78, which corresponds to one of the battery cell stacks 64 or 68 (FIG. 3). The battery cell stack 78 comprises a plurality of cells, such as lithium ion cells or the like. As shown in FIG. 4, a feedback resistor 84, a feedback resistor 86 and a feedback resistor 94 are connected in series across a first terminal 80 and a second terminal 82 of the battery cell stack 78. A current sense resistor 96 is connected between the second terminal 82 and ground.

The resistor 84 is connected between the terminal 80 and an input to an amplifier 88, which has a feedback capacitor 90 connected thereto. The resistor 86 is connected between the same input of the amplifier 88 and a first terminal (cathode) of a diode 92. The resistor 94 is connected between the first terminal (cathode) of the diode 92 and the terminal 82 of the battery cell stack 78. The second terminal (anode) of diode 92 is connected to the output of amplifier 102.

A resistor 98 is connected across the second terminal 82 and an input of the amplifier 102, which also has a grounded capacitor 101 connected thereto. The other input of the amplifier 102 is connected to a grounded resistor 108 and a feedback capacitor 104. The other end of capacitor 104 is connected to the output of the amplifier 102. The resistor 106 is connected across a reference signal input 105 and resistor 108, so resistor 108 is used to set a reference voltage for the amplifier 102. The reference signal input 105 is connected to an input of the amplifier 88.

If a current received at the amplifier 102 is higher than an expected value or range, then the output voltage signal from the amplifier 102 increases. This increase may turn "on" the feedback diode 92, which results in current being fed through the resistor 94. As the current flows through the resistor 94, the voltage across the feedback diode 92 may increase, which causes the output voltage of the amplifier 88 to decrease. In this manner, the charge current delivered by the converter stage 40 (FIG. 3) is regulated. The use of a feedback circuit such as the feedback circuit 100 eliminates the need for a sense resistor, such as the current sense resistor 56 (FIG. 3).

A connection point 112 functions as an analog feedback terminal that may allow the converter stage 40 (FIG. 3) to receive an analog signal for use in controlling the charging of the batteries 34 and 36 (FIG. 3). The analog feedback terminal or connection point 112 is connected to an input of comparator 110. The other input of comparator 110 receives an oscillation signal input 109, which may include a sawtooth wave signal, a sine wave signal or other suitable signal. The feedback input signal or oscillation signal input 109 is used along with the output of the amplifier 88 to produce a digital signal from the output of the comparator 110, such as a digital feedback terminal or connection point 114. The digital feedback terminal 114 includes signals that are generally a rectangle waveform, a pulse train, or other suitable signal.

The digital feedback terminal 114 or the analog feedback terminal 112 is connected to the converter stage 40 (FIG. 3), DC—DC component 42 (FIG. 3), a microprocessor, or any other control system within the device 10. For instance, the analog feedback terminal or connection point 112 is connected to the switch 48 (FIG. 3) to increase or decrease the current delivered by the converter stage 40. Depending on the signal received by the switch 48 (FIG. 3), the converter stage 40 stops the charging process. Thus, the signal feedback supplies the appropriate signal to the power system 32 to manage the current and voltage distribution.

The output of the feedback circuit 100 is used to facilitate the operation of the switches 58, 60, 62, and 66 (FIG. 3) to start or end the charging of the batteries 34 and 36 (FIG. 3). For instance, when the battery cell stack 78 is charging and the charging voltage is above an expected range or value, the resistor 84 conducts current into the first input terminal of the amplifier 88, and the output of amplifier 88 decreases. This changes the signals on the connection points 112 and/or 114, which in turn controls the operation of the switch 48 of FIG. 3. This acts to reduce the voltage across battery cell stack 78.

Figure 5:
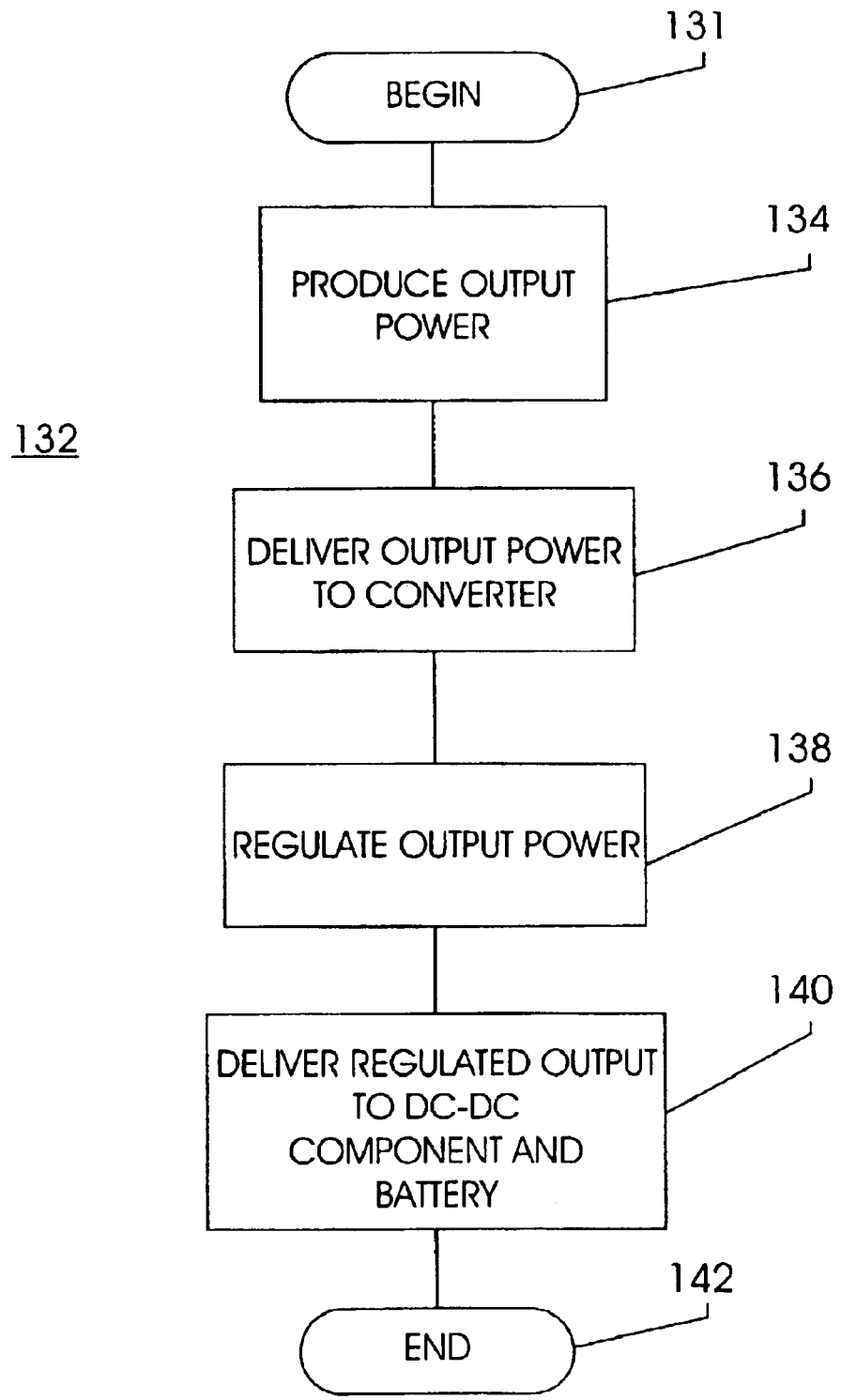
FIG. 5 illustrates a flow diagram in accordance with an embodiment of the present invention.

Referring to FIG. 5, a flow diagram in accordance with embodiments of the present invention is illustrated. The process illustrated in the diagram, which is generally referred to by the reference numeral 132, begins at block 131. At block 134, output power for the operation of an electronic device is produced. An adaptor, such as the 38 (FIG. 2 or FIG. 3) may be the source of this power. As shown at block 136, the power output is delivered to a converter stage, such as the converter stage 40 (FIG. 2 or FIG. 3).

As discussed above with regard to the converter stage, the output power is processed into a regulated power or regulated output, as shown at block 138. For instance, the power is converted into a regulated DC power output, from either an AC or DC input source. The converter is designed to produce regulated power within a predefined range. At block 140, the regulated output is delivered to a DC—DC component, such as the DC—DC component 42 of FIG. 2 or FIG. 3 and to one or more batteries, such as the batteries 34 and 36 of FIG. 2 and FIG. 3. The process ends at block 142.

What is claimed is:

1. A power system, comprising:
    a power adapter capable of producing a power output;
    a converter stage coupled to receive the power output and generate a regulated output;
    a DC—DC component coupled to receive the regulated output; and
    a battery removably coupled to receive the regulated output.

2. The power system set forth in claim 1, comprising a feedback circuit to provide feedback from the battery to the converter stage to manage the charging of the battery.

3. The power system set forth in claim 2, wherein the battery comprises:
    a first switch connected to a terminal of the battery; and
    a second switch connected between the first switch and the feedback circuit, wherein the first and second switches enable the charging of the battery.

4. The power system set forth in claim 1, wherein the DC—DC component adjusts the regulated output into different voltages to be applied to other circuits connected to the power system.

5. The power system set forth in claim 1, comprising a battery circuit to monitor current and voltage levels at the battery to regulate charging of the battery.

6. A power system comprising:
    an adapter capable of producing input power;
    a converter coupled to receive the input power from the adapter;
    a plurality of batteries coupled to the converter;
    a control circuit coupled between the plurality of batteries and the converter; and
    a power distributor to connect the converter and the plurality of batteries to a plurality of components, wherein the converter generates a regulated output sent to the power distributor and the plurality of batteries.

7. The power system as set forth in claim 6, wherein the plurality of batteries is configured to charge from the regulated output.

8. The power system as set forth in claim 6, wherein the control circuit is configured to regulate current from the converter to the batteries by monitoring the current received by each of the plurality of batteries.

9. The power system set forth in claim 6, wherein the power distributor is configured to adjust the regulated output into different voltages to be applied to other circuits connected to the power system.

10. The power system set forth in claim 6, wherein the power system comprises a battery circuit to monitor current and voltage levels of the plurality of batteries.

11. The power system set forth in claim 6, wherein the plurality of batteries comprises:
    a first switch connected to the plurality of batteries; and
    a second switch connected between the first switch and the feedback circuit, wherein the first and second switches enable the charging of each of the plurality of batteries.

12. The power system set forth in claim 6, comprising a current sense circuit for determining current levels transferred to at least one of the plurality of batteries.

13. A method of operation for a power system, wherein the method comprises:
    producing a power output;
    delivering the power output to a converter;
    regulating the power output; and
    delivering the regulated output to a DC—DC component and at least one battery, wherein the battery charges from the regulated output and the DC—DC component adjusts the regulated output into a plurality of voltages that are applied to a plurality of circuits.

14. The method recited in claim 13, comprising using feedback from the at least one battery to control the regulated output at the at least one battery.

15. The method recited in claim 14, comprising preventing one of the at least one battery from charging other batteries.

16. The method recited in claim 15, comprising determining an amount of current flowing to the plurality of batteries.

17. A power system comprising:
    means for providing a power output;
    means for receiving the power output and generating a regulated output;
    means for receiving the regulated output and adjusting the regulated output into a plurality of voltage levels; and
    means for receiving the regulated output to retain a charge.

18. The power system set forth in claim 17, comprising means for adjusting the regulated output into different voltages for a plurality of circuits connected to the power system.

* * * * *